No. 763,577. PATENTED JUNE 28, 1904.
E. L. WALKER.
DETACHABLE BASKET HANDLE.
APPLICATION FILED SEPT. 28, 1903.
NO MODEL. 2 SHEETS—SHEET 1.

Witnesses
Alfred A. Ewis
M. Alwin

Inventor
Enos L. Walker
by Higdon & Longan & Hopkins Attys.

THE NORRIS PETERS CO., PHOTO-LITHO., WASHINGTON, D. C.

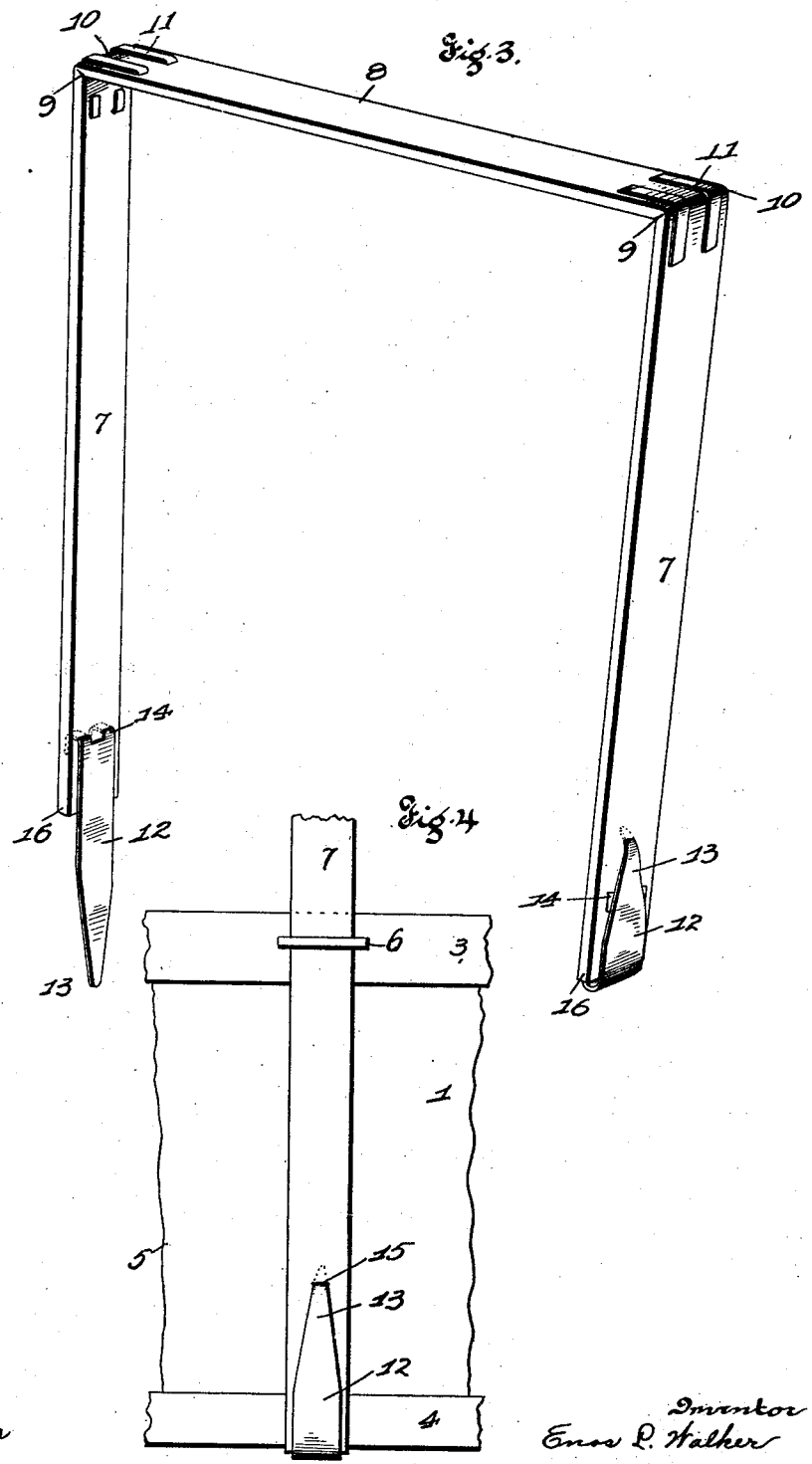

No. 763,577. Patented June 28, 1904.

UNITED STATES PATENT OFFICE.

ENOS L. WALKER, OF ST. LOUIS, MISSOURI.

DETACHABLE BASKET-HANDLE.

SPECIFICATION forming part of Letters Patent No. 763,577, dated June 28, 1904.

Application filed September 28, 1903. Serial No. 174,966. (No model.)

*To all whom it may concern:*

Be it known that I, ENOS L. WALKER, a citizen of the United States, residing at St. Louis, State of Missouri, have invented certain new and useful Improvements in Detachable Basket-Handles, of which the following is a specification containing a full, clear, and exact description, reference being had to the accompanying drawings, forming a part hereof.

My invention relates to improvements in detachable basket-handles; and it consists of the novel construction, combination, and arrangement of parts hereinafter shown, described, and claimed.

Figure 1:
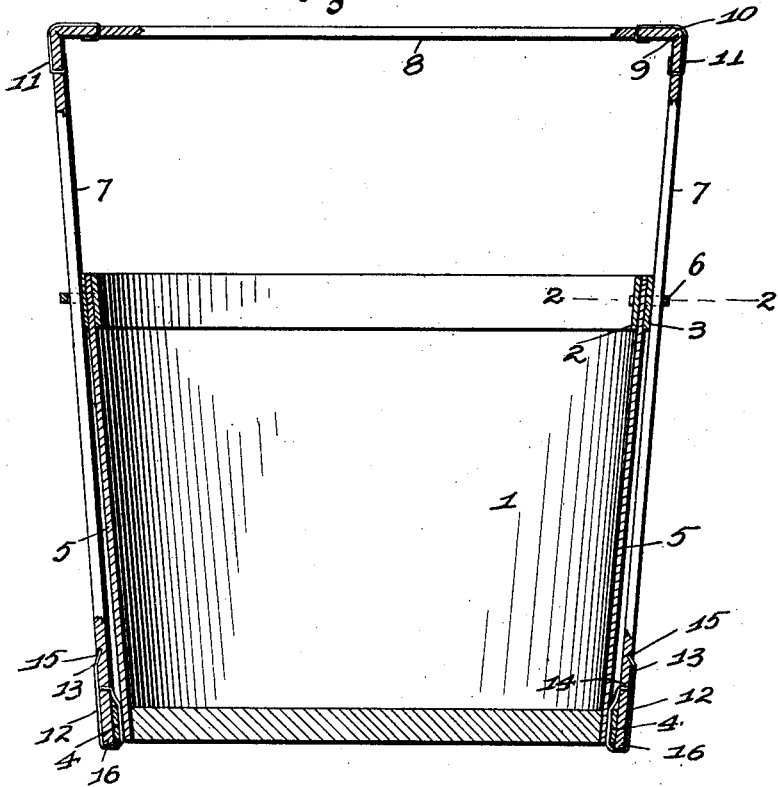
Figure 2:
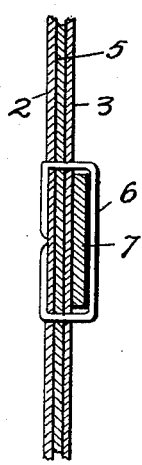

In the drawings, Figure 1 is a perspective view of a basket, showing my invention applied thereto, parts of the handle being in section. Fig. 2 is a section taken on the line 2 2 of Fig. 1. Fig. 3 is a perspective view of the handle detached. Fig. 4 is a side view of a portion of the basket, showing the handle applied thereto with parts of the handle broken away.

Referring to the drawings, 1 indicates a basket, which has an inside rim 2 and an outside rim 3 at the top of the basket and has an outside rim 4 at the bottom, the sides of the basket being indicated by the numeral 5. Secured to the sides of the basket 5 and passing through the rims 2 and 3 are staples 6, which are clenched on the inside and project sufficiently on the outside to permit the ends of the handles to pass freely therethrough.

7 indicates the sides or ends of the handle, and 8 the top or handhold portion, said sides and top or handhold portion all being constructed out of a single piece of wooden material. At the juncture of the sides 7 with the top portion 8 the handle is provided with transverse recesses 9, which are cut out about half the thickness of the handle, so as to permit the same to bend easily. It will be seen in the drawings that the sides 7 are bent at an acute angle relative to the top or handhold portion 8, thus forming angular corners 10. The angular corners 10 are reinforced and strengthened at each corner by means of staples 11, and said staples 11 are driven into the wood from the outside and are clenched on the inside.

Secured to the terminal portions of the sides 7 are flexible metal cleats 12, and said metal cleats 12 are provided with tapering portions 13. The other ends of said flexible cleats 12 are provided with prongs 14, which are driven into the sides 7 from the inside and are clenched on the outside. Formed in the sides 7 are downwardly-inclined recesses 15, adapted to receive the ends of the tapering portions 13 of the flexible cleats 12.

After the handle has been constructed as heretofore described and the flexible cleats 12 applied thereto the handle is applied to the basket as follows: The cleats 12 and sides 7 are inserted downwardly through the staples 6. The cleats 12 are then inserted between the outside rim 4 and the sides 5 of the basket and pushed downwardly until the ends 16 pass down on the outside of the rim 4 a little below the said rim 4, it being noted in this connection that the cleats 12 are secured to the sides 7 at points above the lower ends of said sides about the length of the width of the rim 4 of the basket. The cleats 12 are then bent upwardly around the lower edge of the rim 4 and the ends 16, the tapering portions 13 being bent and the ends thereof inserted into the downwardly-inclined recesses 15, after which operation the handle is secured to the basket, and in order to remove the handle from the basket it is only necessary to release the ends of the tapering portions 13 from their recesses, pull them downwardly, straighten out the flexible cleats 12, and take hold the handle and remove it.

Having fully described my invention, what I claim is—

1. A detachable handle for baskets, constructed of a single piece of wooden material provided with transverse scores at the junctures of its top portion and side portions, metallic staples inserted through said handle at said junctures for strengthening the handle, flexible metallic cleats secured to the terminal portions of the sides of said handle and adapted to be inserted between the lower reinforcing-rim and the sides of the basket for holding the sides of the handle to said basket, substantially as specified.

2. A detachable handle for baskets, constructed of a single and continuous piece of wooden material provided with a handhold portion and side portions bent at an acute angle relative to said handhold portion and provided with recesses, metallic staples for strengthening the handle at the bends of the side portions relative to the handhold portion, and flexible metallic cleats secured to the lower ends of the sides of the handle at points distant from the ends thereof, the free ends of said cleats adapted to be inserted in said recesses, substantially as specified.

3. A detachable handle for baskets, comprising a handhold portion 8, sides 7, corners 10, the said sides 7 being provided with downwardly-inclined recesses 15, metallic staples 11 for strengthening the corners 10, flexible cleats 12 provided with tapering portions 13, and prongs 14 secured to said sides 7, substantially as specified.

In testimony whereof I have signed my name to this specification in presence of two subscribing witnesses.

ENOS L. WALKER.

Witnesses:
   ALFRED A. EICKS,
   M. G. IRION.